United States Patent
Chaloupka et al.

(10) Patent No.: US 12,410,880 B2
(45) Date of Patent: Sep. 9, 2025

(54) MOBILE IRRADIATION PLATFORM FOR HOLLOW-BODY LAMINATES AND METHOD FOR CURING A HOLLOW-BODY LAMINATE

(71) Applicants: NETZSCH Process Intelligence GmbH, Selb (DE); ProKASRO Mechatronik GmbH, Karlsruhe (DE)

(72) Inventors: Alexander Chaloupka, Ingenried (DE); Marco Zier, Fichtelberg (DE); Hannes Roeder, Rehau (DE); Yvan Haberkorn, Prague (CZ)

(73) Assignees: NETZSCH PROCESS INTELLIGENCE GMBH, Selb (DE); PROKASRO MECHATRONIK GMBH, Karlsruhe (DE)

( * ) Notice: Subject to any disclaimer, the term of this patent is extended or adjusted under 35 U.S.C. 154(b) by 160 days.

(21) Appl. No.: 18/275,818

(22) PCT Filed: Jan. 28, 2022

(86) PCT No.: PCT/EP2022/052047
§ 371 (c)(1),
(2) Date: Aug. 4, 2023

(87) PCT Pub. No.: WO2022/167336
PCT Pub. Date: Aug. 11, 2022

(65) Prior Publication Data
US 2024/0117915 A1 Apr. 11, 2024

(30) Foreign Application Priority Data
Feb. 5, 2021 (DE) .......................... 102021201107.1

(51) Int. Cl.
*F16L 55/40* (2006.01)
*B29C 35/08* (2006.01)
(Continued)

(52) U.S. Cl.
CPC .............. *F16L 55/40* (2013.01); *B29C 63/34* (2013.01); *F16L 55/165* (2013.01); *B29C 2035/0827* (2013.01)

(58) Field of Classification Search
CPC ..... F16L 2101/30; F16L 55/165; F16L 55/18; F16L 55/30; F16L 55/40;
(Continued)

(56) References Cited

U.S. PATENT DOCUMENTS

| 4,773,021 A | 9/1988 | Harris et al. |
| 6,371,631 B1 | 4/2002 | Reutemann |
(Continued)

FOREIGN PATENT DOCUMENTS

| DE | 3824931 A1 | 2/1989 |
| DE | 102008022003 A1 | 11/2009 |
(Continued)

OTHER PUBLICATIONS

Office Action from corresponding Japanese Application No. 2023-547672 dated Sep. 10, 2024.
(Continued)

*Primary Examiner* — Philip C Tucker
*Assistant Examiner* — Brian R Slawski
(74) *Attorney, Agent, or Firm* — Lando & Anastasi, LLP

(57) ABSTRACT

A mobile irradiation platform, in particular for use in pipe lining processes for sewer or manhole rehabilitation, includes a chassis, one or more irradiation devices mounted in the chassis, and configured to emit radiation energy and having a radiation direction extending radially to a longitudinal extent of the irradiation platform, a plurality of stabilizing arms articulated to the chassis and designed to centrally support the chassis in the interior of a hollow body, and at least one dielectric sensor attached to a chassis-remote end of one of the plurality of stabilizing arms and designed
(Continued)

to detect changes in dielectric properties in the environment of the stabilizing arm.

12 Claims, 2 Drawing Sheets

(51) Int. Cl.
 *B29C 63/34* (2006.01)
 *F16L 55/165* (2006.01)
(58) Field of Classification Search
 CPC .... B29C 2035/0827; B29C 2035/0833; B29C 63/34; B29C 35/10; B29C 35/08; B29C 66/5221; B29C 66/301
 USPC ......... 156/60, 71, 94, 98, 156, 272.2, 275.5, 156/275.7, 285, 287, 293, 294, 307.1, 156/349, 350, 367, 368, 378, 379.6, 391; 138/97, 98
 See application file for complete search history.

(56) References Cited

U.S. PATENT DOCUMENTS

| | | | |
|---|---|---|---|
| 2005/0104600 A1 | 5/2005 | Cotton | |
| 2010/0314561 A1* | 12/2010 | Reutemann | F16L 55/18 250/522.1 |
| 2012/0215348 A1 | 8/2012 | Skrinde | |
| 2018/0194072 A1* | 7/2018 | Kuzniar | B29C 65/14 |
| 2018/0281241 A1* | 10/2018 | Schropp | B29C 35/0805 |
| 2019/0016021 A1 | 1/2019 | Noll et al. | |
| 2020/0166172 A1* | 5/2020 | Liu | F16L 55/162 |

FOREIGN PATENT DOCUMENTS

| | | |
|---|---|---|
| JP | 2002520202 A | 7/2002 |
| JP | 202082408 A | 6/2020 |
| KR | 101400380 B1 | 5/2014 |

OTHER PUBLICATIONS

Zahouily et al., "Cure Monitoring of UV-Curable Free Radical And Cationic Systems by Using In-situ Dielectric Analysis and Real-Time FT-Infrared Spectroscopy," RadTech e15 2004 Technical Proceedings.

"DEA 288 Ionic—Dielectric Cure Monitoring: Method, Technique, Applications", Netzsch <https://analyzing-testing.netzsch.com/en-US/products/dielectric-analysis-dea/dea-288-ionic>, retrieved from the Internet on Aug. 3, 2023.

International Search Report and Written Opinion from corresponding International Application No. PCT/EP2022/052047 dated May 4, 2022.

Office Action from corresponding Japanese Application No. 2023-547672 dated Mar. 25, 2025.

\* cited by examiner

MOBILE IRRADIATION PLATFORM FOR HOLLOW-BODY LAMINATES AND METHOD FOR CURING A HOLLOW-BODY LAMINATE

CROSS-REFERENCE TO RELATED APPLICATIONS

This application is a U.S. National Stage Application under 35 U.S.C. § 371 of International Application No. PCT/EP2022/052047, filed Jan. 28, 2022, titled MOBILE IRRADIATION PLATFORM FOR HOLLOW BODY LAMINATE AND METHOD FOR CURING HOLLOW BODY LAMINATE, which claims priority to German Application No. 102021201107.1, filed Feb. 5, 2021. International Application No. PCT/EP2022/052047 is incorporated by reference herein in its entirety.

TECHNICAL FIELD OF THE INVENTION

The invention relates to a mobile platform equipped with radiation energy sources, which can be placed in the interior of a flexible hollow body for curing a laminate of the hollow body wall. In addition, the invention relates to a method of curing a laminate forming a hollow body wall by introducing radiation energy from a mobile irradiation platform.

TECHNICAL BACKGROUND

Pipeline systems, namely networks consisting of adjacent hollow bodies such as piping systems, duct systems or manhole systems, need to be repaired in case of defects, fractures or holes in the pipeline walls. In particular in case of pipe systems that are difficult to get to, such as systems laid underground, such repair is frequently difficult, the more so as the outcome of the repair should be ensured to be as permanent and as reliable as possible.

In sewers, for example, intensive quality assurance is necessary to ensure at least that the target condition of a section or component of the repaired sewer system meets the requirements of a newly constructed sewer system. For the rehabilitation of sewer systems, renovation methods, so-called lining methods, can be used in addition to renewal methods in open or trenchless construction. Such methods have the advantage that they can ideally be carried out completely without surface excavation and intervention in the subsurface. With the lining process, it is possible to repair complete pipeline segments along their entire length in a single operation, not just at specific points. Lining methods use so-called inliners—lining laminates that are placed in the existing pipeline segment from the inside and, once installed, form a new interior wall for the existing sewer segment.

Depending on the type, structure and placement in the sewer system, there is made a fine classification of lining methods into: pipe string relining, spiral wound lining, pipe segment lining, close-fit lining, and pipe lining. In pipe lining, currently one of the most relevant methods, a flexible pipe made of a carrier material is impregnated with a reactive resin. The flexible pipe—also known as a pipe liner—is placed in a flexible state in the pipeline segment to be repaired, where it is pressed positively against the interior wall of the existing pipeline by pneumatic or hydraulic methods. The reaction resin can be cured using local energy input, so that after curing the pipe liner forms a jointless plastic pipe reinforced by the carrier material as a new inner lining for the existing (defective) pipe.

Common pipe liners usually have a multi-layer wall structure, which can be formed as a laminate of different layers. In addition to an (optional) inner film made of high-density polyethylene or polyurethane, optionally reinforced with styrene, and one or more outer films with or without a styrene barrier and with or without fabric reinforcement, the middle layer of the laminate is the actual composite layer that crosslinks by means of energy input and forms the tube wall. A combination of a curable resin system and a carrier material is usually used as the composite. Depending on the curing system used, the installation method and the substrate materials, other components may be placed in the composite, for example, organic or inorganic fillers, corrosion inhibitors, reinforcing materials and/or initiators that form reactive species when energy is introduced into the pipe liner to initiate a curing chain reaction (for example, radical or cationic polymerization) of the resin system.

The patent document DE 10 2015 122 313 A1 discloses methods for rehabilitating pipelines, in which a curing device for curing a curable layer of a lining hose in a pipeline is controlled as a function of a temperature measured on the outside of the curable layer. The patent document DE 10 2016 124 116 A1 discloses a device for curing resin-impregnated lining hoses with high-energy radiation, in which an actually absorbed power of a UV radiation source is measured and kept within a target corridor via a power correction.

Determining with sufficient certainty how far curing has progressed in pipe lining processes during the curing process is still problematic. For reasons of process safety and quality requirements, the longest possible irradiation duration and intensity should be preferred, even beyond the actually necessary irradiation duration. On the other hand, there are economic considerations such as the need to keep process costs as low as possible through reduced energy requirements for irradiation and efficient use of personnel. The significance of keeping the process time for completion of the remediation work as short as possible is also beneficial because of any weather conditions that may occur that are detrimental to the successful rehabilitation, such as heavy rains or thaws.

SUMMARY OF THE INVENTION

It is therefore one of the ideas of the invention to provide solutions for more efficient and reliable pipe lining methods involving on-site curing the pipe liners used.

According to a first aspect of the invention, a mobile irradiation platform, in particular for use in pipe lining processes for a sewer or manhole rehabilitation, comprises a chassis, one or more irradiation devices mounted in the chassis and configured to emit radiation energy, and having a radiation direction extending radially to a longitudinal extent of the irradiation platform, a plurality of stabilizing arms articulated to the chassis and designed for centrally supporting the chassis in the interior of a hollow body, and at least one dielectric sensor attached to a chassis-remote end of one of the plurality of stabilizing arms and designed to detect changes in dielectric properties in the environment of the stabilizing arm.

According to a second aspect of the invention, a sewer rehabilitation system comprises a pipe liner the wall of which is formed by a hollow body laminate having a UV-curable composite layer and at least one mobile irradiation platform according to the first aspect of the invention having UV light sources as irradiation devices and designed to cure the composite layer of the hollow body laminate of the pipe liner from the inside out into a hollow body forming an inner lining of a sewer to be rehabilitated.

A third aspect of the invention comprises a method of curing a hollow body laminate, in particular for use in pipe lining methods for sewer or manhole rehabilitation, the method comprising steps of placing a mobile irradiation platform in the interior of a hollow body laminate having a composite layer cured using radiation energy, supporting the mobile irradiation platform against the inner wall of the hollow body laminate using stabilizing arms articulated to a chassis of the irradiation platform, irradiating the hollow body laminate with radiation energy from irradiation devices mounted in the chassis—such as for example UV light sources—and detecting changes in dielectric properties of the hollow body laminate in the environment of the stabilizing arm by means of a dielectric sensor attached to a chassis-remote end of one of the stabilizing arms.

One of the basic concepts of the invention is to monitor in real time the progress of a curing process during an irradiation of the hollow body laminate to be cured by a mobile platform on site by sensors transported with the mobile platform. What is suitable for this purpose is dielectric analysis, in which dielectric properties of the hollow body laminate and their changes during a curing process can be measured without contact by means of dielectric sensors. For this purpose, the dielectric sensors are attached close to the hollow body wall to be formed and, due to the synchronous advance movement with the irradiation devices, can provide measurement parameters that provide direct and immediate information about the effect of the irradiation.

Advantageous embodiments and further developments result from the further dependent claims as well as from the description with reference to the figures.

According to some embodiments, a mobile irradiation platform can further comprise a process controller mounted in the chassis. This process controller, in some embodiments, may be designed to dynamically adjust operating parameters of the irradiation platform, such as advance speed in the interior of a hollow body laminate or irradiation intensity of the irradiation devices, depending on dielectric properties in the environment of the stabilizing arm detected by the dielectric sensor. This advantageously enables a lining process to be adapted to prevailing environmental conditions, by means of which an irradiation procedure can be carried out by a mobile irradiation platform more efficiently and in a time-saving manner, but without compromising reliability and product quality.

According to some further embodiments, a mobile irradiation platform may further comprise a platform controller mounted in the chassis. In some embodiments, the platform controller may be designed to collect and analyze measurement data acquired by the dielectric sensor. In particular in case of multiple dielectric sensors, it can be advantageous to collect measurement data centrally in the mobile platform and to enable synchronized and/or spatially resolved data evaluation. This allows further insights into the progress of curing processes, especially when using platform trains of multiple mobile irradiation platforms used in a row.

According to some further embodiments, a mobile irradiation platform may further comprise a data interface coupled to the platform controller. The data interface may allow measurement data from the dielectric sensor collected by the platform controller to be transmitted to a device external to the platform, such as an external work computer of a sewer rehabilitation system. This has the advantage that users of the mobile irradiation platform can take advantage of better and more convenient real-time monitoring and, in the event of deviations from the standard, make appropriate corrections to the irradiation process manually or eliminate any errors that occur more quickly on site. In some embodiments, the data interface may include a wireless communication module, thereby providing wireless connectivity of the mobile irradiation platform to external devices.

According to some further embodiments, a mobile irradiation platform may further comprise casters attached to chassis-remote ends of the plurality of stabilizing arms. This offers the advantage that advancing the mobile irradiation platform inside of a hollow body laminate can be done easily, energy efficiently and without damaging the laminate.

According to some embodiments of the method, the method may further comprise the step of dynamically adjusting operating parameters of the irradiation platform depending on changes in dielectric properties of the hollow body laminate in the environment of the stabilizing arm detected by the dielectric sensor. Here, for example, the advance speed of the mobile platform, irradiation intensity of the irradiation devices or other irradiation-relevant parameters of the irradiation platform can be adjusted in order to advantageously achieve an increase in irradiation efficiency and a reduction in the time required for curing the hollow body laminate, while at the same time not having to compromise the quality and reliability of the curing process for producing a high-quality hollow body.

According to some further embodiments of the method, the method may further comprise the step of wirelessly transmitting measurement data detected by the dielectric sensor via a data interface of the mobile irradiation platform to an external device outside the interior of the hollow body laminate.

The above embodiments and developments can, where appropriate, be combined with each other in any form. Further possible embodiments, developments and implementations of the invention also comprise combinations not explicitly mentioned of features of the invention which are described above or below with respect to the exemplary embodiments. In particular, a skilled person will here also add individual aspects as improvements or supplements to the respective basic form of the present invention.

BRIEF DESCRIPTION OF THE DRAWINGS

The present invention is explained in detail below with the aid of the exemplary embodiments provided in the schematic drawings, in which.

Figure 1:
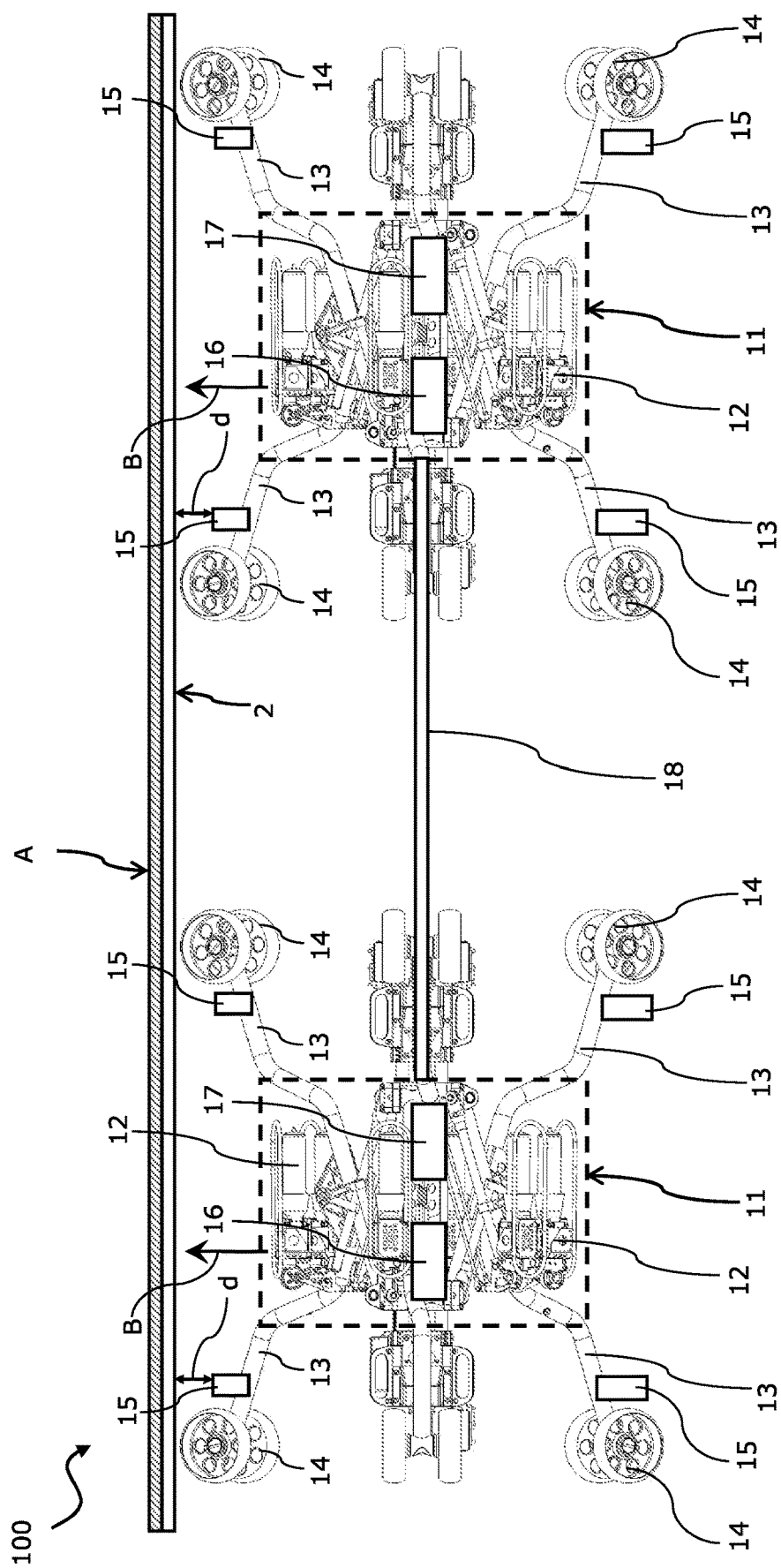
FIG. 1 shows a perspective example view of a mobile platform with irradiation devices according to one embodiment of the invention.

The accompanying figures are intended to convey a further understanding of the embodiments of the invention. They illustrate embodiments and are used in conjunction with the description to explain principles and concepts of the invention. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs—unless explained otherwise.

DESCRIPTION OF EXEMPLARY EMBODIMENTS

Hollow body laminates within the meaning of the present invention comprise layer systems formed into a circumferential shell surface open on at least one side, which form the hollow body wall of an elongated hollow body enclosing a lumen. Hollow body laminates can be formed, for example, in the form of a hollow cylinder, a hollow beam or a tube. In particular, hollow body laminates can be at least partially flexible in their initial form, i.e. form a tube with at least partially flexible tube walls, through the choice of materials of the layer systems. The cross-sectional profile of the hollow body formed by a hollow body laminate can take any shape, in particular a circular profile, an oval profile, an elliptical profile or a convex polygonal profile with rounded corners. The cross-sectional profile of the hollow body formed by a hollow body laminate can also be variable along the longitudinal extent of the hollow body, for example, becoming larger or smaller on average or having steps of varying cross-section. In particular, the cross-sectional profile of the hollow body formed by a hollow body laminate may be defined by the cross-sectional profile of an existing conduit to be lined into which the hollow body laminate is placed.

Figure 2:
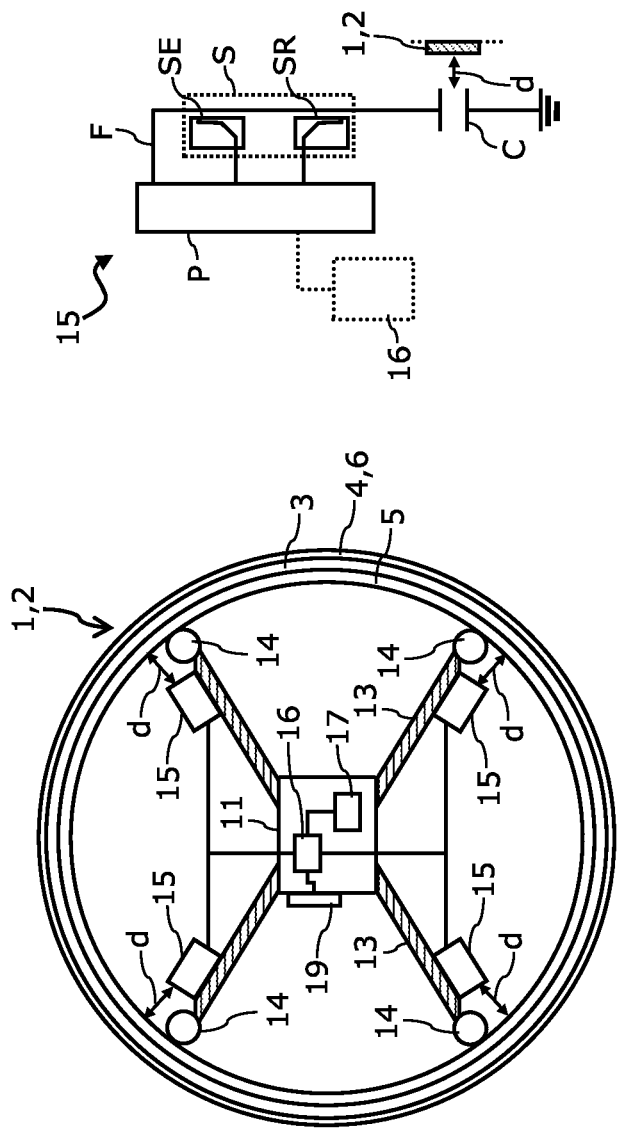
FIG. 2 shows a schematic block diagram of a mobile platform having irradiation devices when used in the interior of a hollow body laminate in accordance with another embodiment of the invention.

FIG. 1 shows a perspective example view of a mobile platform 100 with irradiation devices 12. A corresponding schematic block diagram view of such a mobile platform 100 in operation inside of a hollow body laminate 2 is shown in FIG. 2. Mobile platforms 100 as defined in the present invention, which are equipped with one or more irradiation devices, may also be referred to as mobile irradiation platforms.

As exemplified in FIG. 2, hollow body laminates 2, such as pipe liners for use in pipe lining processes in sewer or manhole rehabilitation of underground sewer systems A, can have a multilayer wall structure that cures to form a hollow body 1 when irradiated with energy input. After curing, the hollow body 1 thus formed constitutes a jointless reinforced plastic pipe as a new inner lining of an existing section of a piping system, such as an underground sewer A system. In some variants, the thickness of the wall of the hollow body 1 thus formed may be approximately between 2 mm and 15 mm, and the nominal width may be approximately between 100 mm and 600 mm.

An optional inner foil 5 can be attached to the inside of the hollow body wall of the hollow body laminate 2. The inner film 5 can be formed, for example, from high-density polyethylene or polyurethane and can optionally be coated with styrene. The inner film 5 serves to prevent contact with process water or water vapor during curing the laminate. After the pipe lining is completed, the inner foil 5 can remain in the hollow body 1 as an inner pipe wall. Alternatively, the inner film 5 can be removed after the curing process.

A composite material 3 is sandwiched between an outer film 4 and inner film 5. The composite layer 3 forms the central layer of the hollow body laminate 2. The composite layer 3 may comprise a combination of a curable resin system and a carrier material. For example, the resin system may comprise an unsaturated polyester resin, a vinyl ester resin, a silicate resin, or an epoxy resin. For example, the carrier material may comprise corrosion-resistant synthetic or polymer fibers, such as polyamide, acrylonitrile polymer, polyethylene terephthalate, or polypropylene. In this process, large-area needlefelt webs can be butt-jointed or overlapped to form pipe liners. Alternatively, it may be possible to use corrosion-resistant glass fibers in a glass fiber scrim or fabric, such as E-CR (aluminum calcium silicate) glass with reinforcing glass fibers. Glass twisted fibers or woven fabrics made of glass fibers can be joined together in overlapping layers to form a pipe liner in order to increase strength and stiffness. It may also be possible to use mixed systems of synthetic fibers and glass fibers, so-called sandwich systems, in order to be able to selectively adjust the strength and stiffness of the pipe liner by zone or section.

In addition to the resin system and carrier material, other components can optionally be placed in the composite layer 3, for example organic or inorganic fillers, corrosion inhibitors and/or reinforcing materials. The carrier material is impregnated with the resin system used, cooled and/or opaquely packaged depending on the resin system and only released on site during sewer rehabilitation to activate the resin system. The resin system can be cured by different initiators that form reactive species when energy is introduced into the pipe liner. Thermal and light-induced initiation can be used as curing methods. Irradiation energy sources can be used for this purpose, for example, injecting infrared radiation and/or UV radiation controllably and locally into the composite layer 3. In a thermal cure, heat of, for example, 70° C. to 100° C. initiates a curing chain reaction as a result of which—depending on the thermal initiator used—radical or cationic polymerization takes place, resulting in complete curing the composite layer 3 and thus also of the hollow body laminate 2. Similarly, if photoinitiators are embedded in the composite layer 3, an input of UV radiation energy can lead to radical or cationic polymerization and subsequent curing the hollow body laminate 2. Usual curing times are several minutes, such as about 2 to 15 minutes, especially about 4 to 10 minutes.

An outer film 4 can be attached to the outside of the hollow body wall of the hollow body laminate 2. The outer film 4 can also be formed, for example, from high-density polyethylene or polyurethane and optionally have fabric reinforcement. The outer film 4 serves to prevent excess composite material 3 from leaking out of the hollow body laminate 2 into the environment and, at the same time, to protect the composite layer 3 from the physical and chemical effects of any residual fluids and solids transported in the piping system to be rehabilitated.

A fabric-reinforced light protection film 6 can optionally be applied around the outer film 4 as the outermost layer. This light protection film 6 can prevent premature activation of the composite layer 3 by ambient light, particularly in the case of UV-activatable composite layers 3. This significantly simplifies storage, transport and placement in a pipeline to be rehabilitated.

The mobile platform 100 includes a central chassis 11, which is also referred to as a mounting frame or support frame. One or more irradiation devices 12 are housed or mounted in the chassis 11 and are designed to emit radiation energy B outwardly from the chassis 11. In particular, the radiation energy B may be emitted from the irradiation devices 12 radially outwardly and substantially at perpendicular incidence to the hollow body laminate 2. The irradiation devices 12 may be activated after the mobile platform 100 is placed in the interior of a hollow body laminate 2, such as in the interior of a pipe liner, to trigger a curing reaction by a localized application of energy to the composite layer(s) 3 of the hollow body laminate 2. Depending on the resin system used and the type of initiator, if any, present in the composite layer 3, various irradiation devices 12 can be used—thermal radiation sources, infrared lamps, or even UV light sources such as UV laser diodes, UV light-emitting diodes, UV cold cathode tubes, black light lamps, or gas discharge lamps such as high-pressure metal halide lamps or low-pressure metal halide lamps (for example, based on sodium, cadmium, mercury, or other metal halides). The number, type and combination of irradiation devices 12 is in principle not limited—it may be possible to use more than one irradiation device 12 of the same or different design. In particular, in the case of mobile platforms 100 for pipe liners, it may be possible to arrange a plurality of irradiation devices 12 uniformly around an axial direction of the mobile platform 100 in the direction of the longitudinal extent of the hollow body laminate 2, thereby being able to achieve radially uniform irradiation of the hollow body laminate 2.

The chassis 11 may also house appropriate electronic circuitry (not explicitly illustrated in FIG. 1 and FIG. 2), electrical power sources, and/or control devices for operating the irradiation devices 12. It may also be possible for the mobile platform 100 to be connected to power sources external to the hollow body laminate 2, such as a power generator or electrical power grid, via electrical conductors, particularly located outside a conduit system to be refurbished.

Stabilizing arms 13 are arranged on the chassis 11, with wheels or casters 14 attached to their ends, for example. The stabilizing arms 13, which may be articulated to the chassis 11 so as to be movable relative to the chassis 11 in particular, may be used to support the mobile platform 100 against the interior wall of a conduit, sewer, manhole or other cavity defined by a hollow body laminate 2. By adjusting the stabilizing arms 13 accordingly, the central chassis 11 can preferably be kept central and in a controllable position inside of the hollow body laminate 2. This enables uniform irradiation of the hollow body laminate 2 over its circumference by the irradiation devices 12.

With the aid of the casters 14, the mobile platform 100 can be moved along the axial direction inside of the hollow body laminate 2. For this purpose, the mobile platform 100 may have its own drive or, alternatively, may be pushed or pulled through the interior of the hollow body laminate 2 by the application of force from the outside. As an alternative to the casters 14, other movement-conveying end elements of the stabilizing arms 13 can be provided, such as low-friction coated sliding shoes or sprockets.

As exemplified in FIG. 1, multiple mobile platforms 100 may be connected together to form a platform train. FIG. 1 schematically shows two mobile platforms 100 in a platform train, but more than two mobile platforms 100 in a platform train are also possible. The mobile platforms 100 of a platform train may be coupled together using traction cables 18. The traction cables 18 may not only mediate mechanical coupling of the individual mobile platforms 100, but electrical connection lines may also be provided to pass control signals or electrical power between the individual mobile platforms 100.

Figure 3:
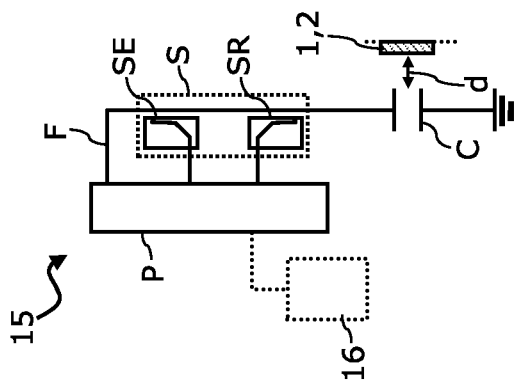
FIG. 3 shows a schematic block diagram of a circuit for a dielectric sensor for use in a mobile platform according to FIG. 1 or 2, in accordance with a further embodiment of the invention.

Dielectric sensors 15 may be attached to one, some, or all of the stabilizing arms 13 at the end furthest from the chassis 11 (i.e., furthest from the chassis 11 after the stabilizing arms 13 are unfolded). By way of example, FIG. 1 and FIG. 2 each show four of the stabilizing arms 13 of the mobile platform 100 as being equipped with dielectric sensors 15—however, it should be clear that any other number of dielectric sensors 15 are also possible. The dielectric sensors 15 include a sensor housing (not explicitly shown) and active sensor components, the electrical circuitry of which is shown in more detail in the exemplary block diagram of FIG. 3.

Dielectric sensors 15 operate on the principle of measuring the reflectance of a measuring capacitor C and changing the reflectance due to changes in the dielectric properties in the environment of the measuring capacitor C. The capacitance of the measuring capacitor C depends not only on the geometric dimensions of the capacitor and the dielectric constant in vacuum, but also on the dielectric constant in the environment of the capacitor. In particular, for plate-shaped capacitors with electrodes staggered in the plane of extension of the capacitor plates, the boundary electric field extends away from the capacitor plates into the environment. When the dielectric properties of the environment change at a typical distance d away from the active measurement surface of the dielectric sensor 15, the reflection behavior of alternating electrical voltage at the measurement capacitor C also changes. Planar electrode configurations can be used as the measurement capacitor C, some of which are based on a monotrode design and are characterized by large electrode distances in order to be able to reliably detect changes in the dielectric constant even at greater distances.

An electrical alternating voltage F of a certain frequency and amplitude is applied to the measuring capacitor C by means of a sensor control device P. The voltage is applied to the measuring capacitor C by means of the sensor control device. The actual alternating voltage output is measured via an input directional coupler SE of a sensor interface S and its frequency and amplitude are determined in the sensor control device P. After the reflection of the electrical alternating voltage wave at the measuring capacitor C, the returning, i.e. reflected, part of the alternating voltage wave is also measured via an output directional coupler SR of the sensor interface S and its frequency and amplitude are determined in the sensor control device P. The ratio between the incoming and returning alternating voltage wave is determined by the sensor control device P as a time-resolved measurement parameter.

The hollow body laminate 2 has a certain viscosity in its initial flexible state. Dipoles contained in the composite layer 3, such as terminal groups of monomers of the resin system, can align to a certain extent in the electric field. When the temperature is increased—for example, when irradiated by an irradiation device 12—the ion mobility and degree of dipole alignment initially increase. Only at the onset of polymerization by radical or cationic crosslinking does ion mobility decrease again and the possibility for dipole alignment is severely limited. In the fully crosslinked state, the ion viscosity is therefore greatly increased and the dipole alignment greatly reduced.

For example, the sensor control device P may be implemented as a software defined radio ("SDR") system in which the hardware for characterizing the incoming and returning alternating voltage waves includes an amplifier, a downsampler, and an analog-to-digital converter (ADC). The high-frequency alternating voltage waves, whose frequency can be in the range of several hundred MHz to several GHz, for example, are mixed down to baseband in the range of a few kHz and digitized. The sensor control device P then further comprises a signal processor such as an ASIC or an FPGA, in which a digital evaluation of the digitized baseband measurement signals is performed via application programs.

The reflection coefficient, which is formed as the ratio between the returning and incoming alternating voltage wave, is a particularly suitable measurement parameter. After the start of the curing process, the reflection coefficient will decrease as the heating of the composite layer 3 causes a reduction in viscosity. Thereafter, after a reflection factor minimum, there will be an increase in reflection factor as the curing reaction begins. At a certain point, a plateau region will be reached in which the reflection factor no longer changes, or at least no longer changes significantly, because complete curing the composite layer 3 has been completed.

A time-resolved assessment of the progress of the curing reaction as a result of irradiation by the irradiation devices 12 can therefore be made via the dielectric sensors 15, which are arranged at a laminate-side end of the stabilizing arms 13 and are thus spaced only a small measuring distance d from the hollow body laminate 2. In particular, a threshold value of the change in reflection factor can be set in the sensor control device P, the undershooting of which indicates sufficiently complete curing the composite layer 3 and thus of the hollow body laminate 2 to form a hollow body 1.

In this case, the measurement parameters of the dielectric sensors 15 can be processed and evaluated either on site in the sensors 15 themselves, in a platform control unit 16 arranged in the chassis 11, or in a measurement computer arranged outside the mobile platform 100, such as a work PC of a mobile sewer rehabilitation system. For this purpose, the platform control unit 16 can collect the measured data from the individual dielectric sensors 15 of a platform 100 and emit it to the outside of the line system via an external data interface 19. The external data interface 19 may, for example, be wired. Alternatively, or additionally, it may also be possible to use a wireless communication module as an external data interface 19 via which measurement data can be transmitted wirelessly from the platform control unit 16, for example via a WLAN or radio connection, to an external work PC. In particular, the platform control unit 16 can also perform a conversion of analog measurement data into digital measurement signals, since a transmission of digital signals improves the electromagnetic compatibility and freedom from interference with respect to, for example, the electrical power supply or the control of the irradiation devices 12.

The mobile platform 100 may include a process control device 17, which is also attached to the chassis 11 and coupled to the platform control device 16. For example, the process control device 17 can dynamically adjust the advancing of the mobile platform 100, the instantaneous irradiance of the irradiation devices 12, or other parameters relevant to the irradiation of the hollow body laminate 2 depending on the degree of cure of the hollow body laminate 2 as determined by the dielectric sensors 15. For example, it may be possible to increase the speed of movement of the mobile platform 100 if the curing the hollow body laminate 2 is completed locally before the mobile platform is actually scheduled to continue moving. It may also be possible to increase or decrease the irradiance of the irradiation devices 12, depending on the local curing rate determined via measurement of the dielectric sensors 15. In addition, the detected measurement parameters of the dielectric sensors 15 can be used for quality assurance, for example, to provide evidence of compliance with a standard during curing the hollow body laminate 2.

It may also be possible to perform the evaluation of the measurement parameters of the dielectric sensors 15 and the control of the mobile platform 100 completely outside the line system. For this purpose, the movement and operating properties of the mobile platform 100 can be dynamically adjusted from a control computer located outside the hollow body laminate 2 via corresponding control signals as a function of the degrees of cure of the hollow body laminate 2 determined by the dielectric sensors 15.

Figure 4:
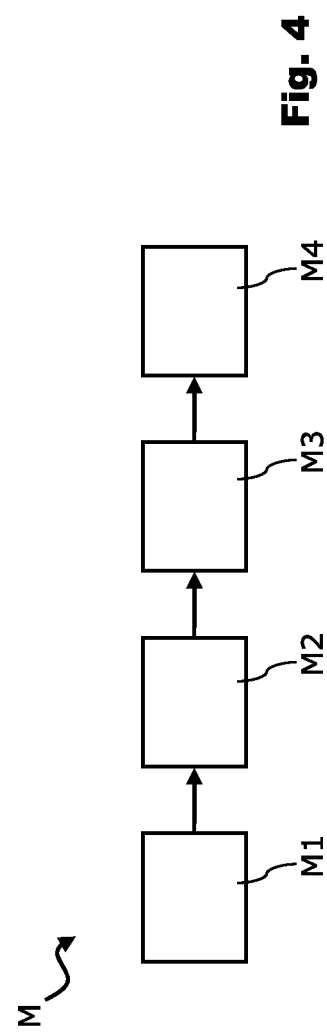
FIG. 4 shows a flow diagram of a method for curing a hollow body laminate according to a further embodiment of the invention.

FIG. 4 shows a flow diagram of a process M for curing a hollow body laminate 2, in particular for use in rehabilitation work of a pipeline system A. The process M can be used, for example, as part of a pipe lining process in sewer or manhole rehabilitation. For example, the method M may be performed using a mobile platform, such as the mobile platform 100, or a platform train illustrated and described in connection with FIGS. 1, 2 and 3.

First, a hollow body laminate having a radiation reactive composite layer, such as the hollow body laminate 2 explained in connection with FIGS. 1 and 2, is prepared for placing a mobile irradiation platform 100. For example, a pipe liner can be placed in a pipe to be rehabilitated in the course of a sewer rehabilitation procedure. This can be done via a retraction process, an inversion process, or a combination of the two types of processes mentioned above. In the retraction process, the hollow body laminate 2 is pulled into the pipeline to be rehabilitated from the outside with the aid of cable winches. In this case, protective sliding foils can be installed in the bottom of the line before the retraction process. After retraction, the hollow body laminate 2 may be hydraulically or pneumatically pressurized to create a lumen in the interior of the hollow body laminate 2 pressed against the interior wall of the pipe to be rehabilitated. In the inversion process, on the other hand, an initial piece of the hollow body laminate 2 can be crimped onto an opening in the pipe to be rehabilitated and crimped into the pipe via hydraulic or pneumatic overpressure.

Regardless of the method of placement, after the hollow body laminate 2 has been prepared, a mobile irradiation platform 100 or even a platform train of multiple mobile irradiation platforms 100 will be placed in the lumen of the hollow body laminate 2 in a first step M1 of the method M. This can also be done, for example, with the aid of winches. In a second step M2, the mobile irradiation platform 100 is supported on the interior wall of the hollow body laminate 2 via stabilizing cantilevers 13 articulated to a chassis 11 of the irradiation platform 100. For this purpose, the stabilizing booms 13, optionally equipped with casters 14, are folded away from the chassis 11 and brought into contact with the interior wall of the hollow body laminate 2 by means of the end portions remote from the chassis. As a result, the chassis 11 can be positioned and stabilized approximately centrally within the lumen of the hollow body laminate 2.

After the correct positioning of the mobile irradiation platform(s) 100, the irradiation of the hollow body laminate 2 with radiation energy from the irradiation devices 12 installed in the chassis 11 can be performed in a third step M3. For example, the irradiation devices 12 may include UV light sources that radiate UV light outward in the radial direction of the conduit. The radiation energy causes initiation of a local curing reaction in the composite layer 3 of the hollow body laminate 2. In a fourth step M4 of method M, changes in dielectric properties of the hollow body laminate 2 in the environment of the stabilizing arm 13 are detected.

This is done by means of a dielectric sensor or sensors 15 attached to the chassis-remote end (i.e., furthest from the chassis 11 after the stabilizing arms 13 have been unfolded) of one or more of the stabilizing arms 13. For example, the dielectric sensor 15 may have the structure and corresponding operation explained in connection with FIG. 3. Time-resolved local measurement of the dielectric properties of the hollow body laminate 2 can be used to determine at what stage of cure the hollow body laminate 2 is.

Based on the changes in dielectric properties of the hollow body laminate 2 detected by the dielectric sensor 15, operating properties of the irradiation platform 100, such as advance speed or irradiation intensity of the irradiation devices 12, can also be dynamically adjusted to the determined curing behavior. The detected measurement data from the dielectric sensor 15 or the plurality of sensors 15 can be transmitted to an external device outside the inside of the hollow body laminate 2. For this purpose, for example, a wired transmission or also a wireless transmission via a data interface 19 of the mobile irradiation platform 100 can take place. The transmitted measurement data can be used, for example, for real-time monitoring of the remediation process and/or for documentation purposes as part of quality assurance.

In the detailed description above, various features have been summarized in one or more examples so as to provide a more cogent representation. However, it should be clear here that the above description is of a purely illustrative, but in no way limiting nature. The description serves to cover all alternatives, modifications and equivalents of the various features and embodiments. Many other examples will become immediately clear to a person skilled in the art owing to their expert knowledge in view of the above description.

The embodiments have been selected and described in order to be able to show, as clearly as possible, the principles on which the disclosure herein is based and the possible applications thereof in practice. As a result, skilled persons can optimally modify and use the disclosure herein and the various embodiments thereof with respect to the intended purpose thereof. In the claims and the description, the terms "containing" and "comprising" are used as linguistically neutral terminology for the corresponding term "including". Furthermore, use of the terms "a", "an" and "one" is not intended to fundamentally exclude a plurality of such described features and components.

What is claimed is:

1. A mobile irradiation platform, comprising:
   a chassis;
   one or more irradiation devices mounted in the chassis and configured to emit radiation energy, and having a radiation direction extending radially to a longitudinal extent of the irradiation platform;
   a plurality of stabilizing arms hingeably connected to the chassis and designed for centrally supporting the chassis in the interior of a hollow body; and
   at least one dielectric sensor attached to a chassis-remote end of one of the plurality of stabilizing arms and designed to detect changes in dielectric properties in the environment of the stabilizing arm.

2. The mobile irradiation platform according to claim 1, further comprising:
   a process controller mounted in the chassis and designed to dynamically adjust operating parameters of the irradiation platform depending on the dielectric properties in the environment of the stabilizing arm detected by the dielectric sensor.

3. The mobile irradiation platform according to claim 1, further comprising:
   a platform controller mounted in the chassis and designed to collect and evaluate measurement data detected by the dielectric sensor.

4. The mobile irradiation platform according to claim 3, further comprising:
   a data interface coupled to the platform controller and designed to transmit the measurement data of the dielectric sensor collected by the platform controller to a device external to the platform.

5. The mobile irradiation platform according to claim 4, wherein the data interface comprises a wireless communication module.

6. The mobile irradiation platform according to claim 1, further comprising:
   casters attached to chassis-remote ends of the plurality of stabilizing arms.

7. The mobile irradiation platform according to claim 1, wherein the one or more irradiation devices comprise UV light sources.

8. A sewer rehabilitation system, comprising:
   a pipe liner the wall of which is formed by a hollow body laminate with a UV-curable composite layer; and
   at least one mobile irradiation platform designed to cure the composite layer of the hollow body laminate of the pipe liner from the inside out into a hollow body forming an inner lining of a sewer to be rehabilitated, the at least one mobile irradiation platform comprising:
   a chassis;
   UV light sources mounted in the chassis and configured to emit UV radiation energy, and having a radiation direction extending radially to a longitudinal extent of the irradiation platform;
   a plurality of stabilizing arms hingeably connected to the chassis and designed for centrally supporting the chassis in the interior of the hollow body; and
   at least one dielectric sensor attached to a chassis-remote end of one of the plurality of stabilizing arms and designed to detect changes in dielectric properties in the environment of the stabilizing arm.

9. A method for curing a hollow body laminate, comprising:
   placing a mobile irradiation platform in the interior of a hollow body laminate having a composite layer cured using radiation energy;
   supporting the mobile irradiation platform against the inner wall of the hollow body laminate using stabilizing arms articulated to a chassis of the irradiation platform;
   irradiating the hollow body laminate with radiation energy from irradiation devices mounted in the chassis; and
   detecting changes in dielectric properties of the hollow body laminate in the environment of the stabilizing arm by means of a dielectric sensor attached to a chassis-remote end of one of the stabilizing arms.

10. The method according to claim 9, further comprising a step of dynamically adjusting operating parameters of the irradiation platform depending on changes in the dielectric properties of the hollow body laminate in the environment of the stabilizing arm detected by the dielectric sensor.

11. The method according to claim 9, further comprising a step of wirelessly transmitting measurement data detected by the dielectric sensor via a data interface of the mobile irradiation platform to an external device outside the interior of the hollow body laminate.

12. The method according to claim 9, wherein the irradiation devices comprise UV light sources.

* * * * *